(12) United States Patent
Yamamoto et al.

(10) Patent No.: US 12,001,900 B2
(45) Date of Patent: Jun. 4, 2024

(54) INKJET PRINTING METHOD AND INKJET PRINTING DEVICE

(71) Applicant: 3M INNOVATIVE PROPERTIES COMPANY, St. Paul, MN (US)

(72) Inventors: Takeo Yamamoto, Yamagata (JP); Katsuya Ono, Yamagata (JP); Koji Saito, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 75 days.

(21) Appl. No.: 17/765,998

(22) PCT Filed: Oct. 8, 2020

(86) PCT No.: PCT/IB2020/059474
§ 371 (c)(1),
(2) Date: Apr. 1, 2022

(87) PCT Pub. No.: WO2021/070115
PCT Pub. Date: Apr. 15, 2021

(65) Prior Publication Data
US 2022/0371335 A1 Nov. 24, 2022

(30) Foreign Application Priority Data

Oct. 11, 2019 (JP) .................................. 2019-188080

(51) Int. Cl.
*G06K 15/10* (2006.01)
*B41M 3/00* (2006.01)
*B41M 7/00* (2006.01)

(52) U.S. Cl.
CPC ........... *G06K 15/105* (2013.01); *B41M 3/008* (2013.01); *B41M 7/0045* (2013.01); *B41M 7/0081* (2013.01)

(58) Field of Classification Search
CPC .. B41M 3/008; B41M 7/0081; B41M 7/0045; B41J 2/2114; B41J 11/00214
See application file for complete search history.

(56) References Cited

U.S. PATENT DOCUMENTS 6,963,423 B2   11/2005   Ogasahara et al.
9,802,425 B2   10/2017   Seki et al.
(Continued)

FOREIGN PATENT DOCUMENTS

JP   2000-318140      11/2000
JP   2007210169 A      8/2007
(Continued)

OTHER PUBLICATIONS

International Search Report for PCT Application No. PCT/IB2020/059474 dated Jan. 14, 2021, 3 pages.

*Primary Examiner* — Julian D Huffman

(57) ABSTRACT

An inkjet printing method forming a decorative printed layer having a three-dimensional texture on a printing surface is described. The inkjet printing method includes: printing dots of curable ink that cure under a predetermined condition based on dot pattern data indicative of printed positions of the dots to be printed on the printing surface; and curing the printed dots. The dot pattern data indicates that: a distance between the adjacent dots becomes a distance where the adjacent dots before the curing are allowed to be maintained independently without bonding to one another in a first region; and the distance between the adjacent dots becomes a distance where the adjacent dots before the curing bond to one another in a second region different from the first region. Such a method may allow forming a decorative printed layer having a three-dimensional texture with a desired gloss level.

11 Claims, 12 Drawing Sheets

(56) References Cited

U.S. PATENT DOCUMENTS

| | | | |
|---|---|---|---|
| 10,343,419 | B2 | 7/2019 | Kubo |
| 10,471,712 | B2 | 11/2019 | Ohara |
| 10,933,667 | B2 | 3/2021 | Ohara |
| 2008/0117246 | A1 | 5/2008 | Hoshino |
| 2011/0298850 | A1 | 12/2011 | Ochiai |
| 2012/0031992 | A1 | 12/2012 | Wada |
| 2014/0111594 | A1 | 4/2014 | Schuh et al. |
| 2016/0368293 | A1* | 12/2016 | Shimada ............... B41J 29/38 |
| 2018/0194145 | A1 | 7/2018 | Kasahara et al. |
| 2019/0068832 | A1 | 2/2019 | Oya |

FOREIGN PATENT DOCUMENTS

| | | | |
|---|---|---|---|
| JP | 2011224955 A | 11/2011 | |
| JP | 2012232470 A | 11/2012 | |
| JP | 2013166306 A | 8/2013 | |
| JP | 6131216 | 5/2017 | |
| JP | 6141124 | 6/2017 | |
| JP | 2018-122529 | 8/2018 | |
| WO | WO2000-19704 | 4/2000 | |
| WO | WO-2007065275 A1 * | 6/2007 | ............ B41J 11/002 |

* cited by examiner

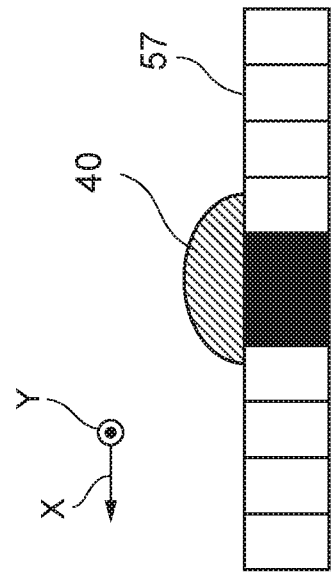
FIG. 9A
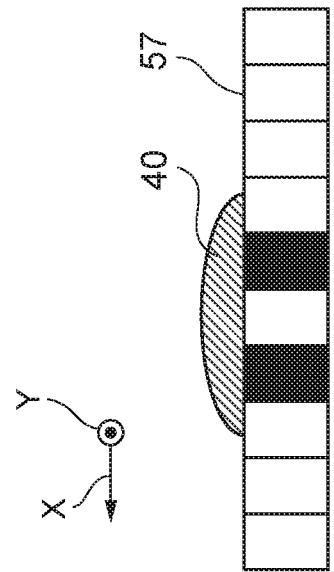
FIG. 9B
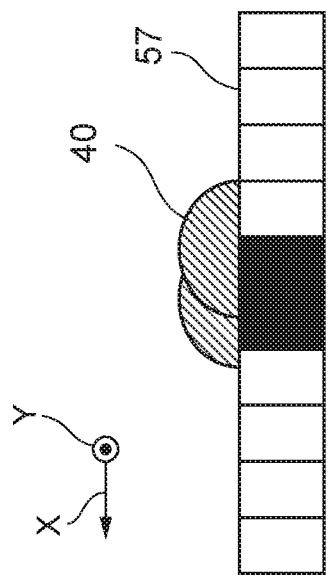
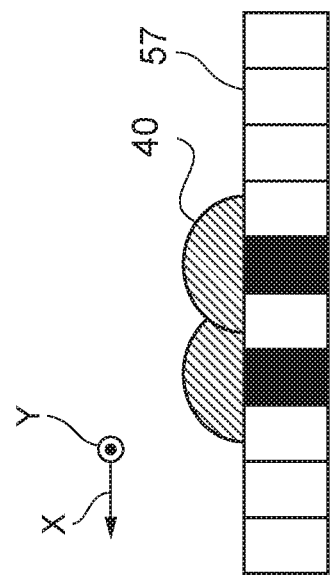

*FIG. 10*

INKJET PRINTING METHOD AND INKJET PRINTING DEVICE

TECHNICAL FIELD

One aspect of the present invention relates to an inkjet printing method and an inkjet printing device.

BACKGROUND

Conventionally, one described in Patent Document 1 has been known as an inkjet printing method. In JP 2015-96321 A, after performing color printing on a printing surface, an overcoat layer is formed on an ink layer produced by the color printing by an inkjet method. This enhances a gloss of the printing surface.

SUMMARY

Technical Problem

Here, the inkjet printing method of Patent Document 1 allows forming a so-called glossy gloss layer on the printing surface. Thus, not only the formation of the glossy gloss layer, but also formation of a decorative printed layer having a three-dimensional texture, such as a matte layer, on an entire surface or a desired part by inkjet printing has been required.

An object of one aspect of the present invention is to provide an inkjet printing method and an inkjet printing device that can excellently form a decorative printed layer having a three-dimensional texture.

Solution to Problem

An inkjet printing method according to one configuration of the present invention forms a decorative printed layer having a three-dimensional texture on a printing surface. The inkjet printing method includes: printing dots of curable ink that cure under a predetermined condition based on dot pattern data indicative of printed positions of the dots to be printed on the printing surface; and curing the printed dots. The dot pattern data indicates that: a distance between the adjacent dots becomes a distance where the adjacent dots before the curing are allowed to be maintained independently without bonding to one another in a first region; and the distance between the adjacent dots becomes a distance where the adjacent dots before the curing bond to one another in a second region different from the first region.

An inkjet printing method according to one configuration of the present invention forms a decorative printed layer having a three-dimensional texture on a printing surface. The inkjet printing method includes: acquiring dot pattern data indicative of printed positions of dots to be printed on the printing surface corresponding to gloss level information indicative of glossiness in a region in the printing surface; printing the dots of curable ink based on the dot pattern data; and curing the printed dots. The dot pattern data indicates that: a distance between the adjacent dots becomes a distance where the adjacent dots before the curing are allowed to be maintained independently without bonding to one another when the gloss level information indicates that the gloss level information is lower than a specific glossiness; and the distance between the adjacent dots becomes a distance where the adjacent dots before the curing bond to one another when the gloss level information indicates that the gloss level information is higher than the specific glossiness.

An inkjet printing device according to one configuration of the present invention forms a decorative printed layer having a three-dimensional texture on a printing surface. The inkjet printing device includes a printing unit, a curing unit, a processor, and a medium. The printing unit is configured to eject curable ink that cures under a predetermined condition. The medium includes a series of pieces of instruction information executable by the processor and usable by a computer connected to the processor. The instruction information: causes the printing unit to print dots of the curable ink based on dot pattern data indicative of printed positions of the dots to be printed on the printing surface; and controls the curing unit so as to cure the printed dots. The dot pattern data indicates that: a distance between the adjacent dots becomes a distance where the adjacent dots before the curing are allowed to be maintained independently without bonding to one another in a first region; and the distance between the adjacent dots becomes a distance where the adjacent dots before the curing bond to one another in a second region different from the first region.

Advantageous Effects of Invention

With the one configuration of the present invention, there can be provided the inkjet printing method and the inkjet printing device that can excellently form the decorative printed layer having the three-dimensional texture by control to a desired gloss level.

BRIEF DESCRIPTION OF THE DRAWINGS

FIGS. 9A and 9B are schematic views illustrating a state when a gloss layer is formed.

FIG. 10 is a conceptual drawing illustrating an example of information of dot pattern data.

DETAILED DESCRIPTION

Detailed descriptions of the embodiments according to the present invention are given below with reference to the attached drawings. In the description of the drawings, identical or equivalent elements are denoted by the same reference signs, and redundant description of such elements will be omitted.

Figure 1A:
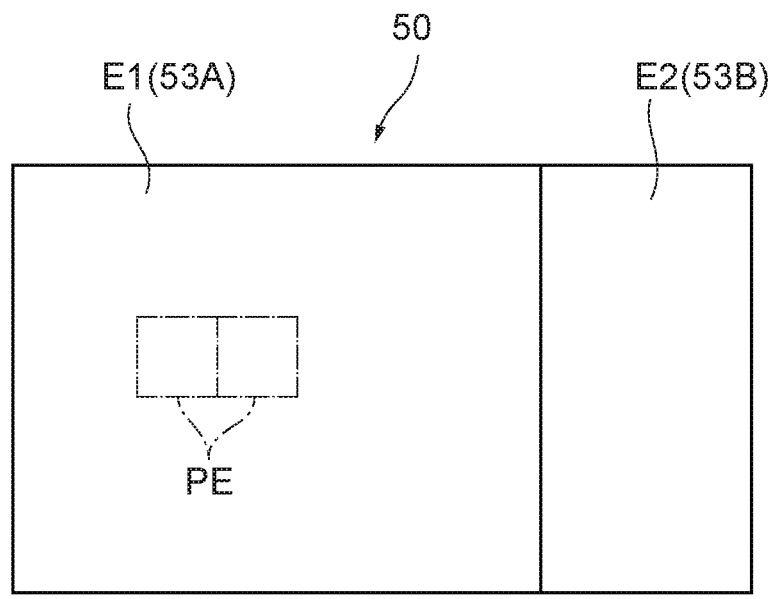
FIGS. 1A and 1B are plan views of a printed material.

First, with reference to FIG. 1A to FIG. 2C, the following describes a printed material 50 printed by an inkjet printing device 1 and an inkjet printing method according to the present embodiment. As illustrated in FIGS. 1A and 1B, the printed material 50 is a sheet-shaped member having a surface printed by the inkjet printing device 1. As illustrated in FIGS. 2A and 2B, the printed material 50 is configured by forming a color printed layer 52 on a base material 51 and forming a decorative printed layer 53 on the color printed layer 52. The base material 51 is a target to be printed, for example, a member made from a material, such as vinyl chloride resin, acrylic resin, urethane resin, polyester resin, and a paper is employed. An adhesive and a release sheet that protects the adhesive can be provided on a back surface of the base material 51. The color printed layer 52 is a layer formed by inkjet printing of color ink by the inkjet printing device 1. The color ink is resin containing a pigment, such as cyan, magenta, yellow, or black, and is ink that contains a solvent and fixed by drying or ink that contains a photoinitiator and a photocurable monomer and curable by light. The decorative printed layer 53 may be directly formed on the base material 51 without the color printed layer 52. The decorative printed layer 53 is a printed layer having a three-dimensional texture (see FIGS. 2A to 2C). The three-dimensional texture is a layer formed so as to bulge from the printing surface 57 having a predetermined height at least greater than a thickness of the color printed layer 52. The decorative printed layer 53 is a layer that forms glossiness and a texture on the surface of the printed material 50.

The decorative printed layer 53 is formed using curable ink that cures under predetermined conditions. In other words, curing the printed curable ink forms the decorative printed layer 53. The curing conditions of the curable ink are not particularly limited. For example, the curable ink may be cured by radiation irradiation (such as ultraviolet light) and may be cured under heating conditions. The curable ink may be colorless and transparent. However, the decorative printed layer 53 may be formed using colored curable ink. A radiation curable ink composition and a thermosetting ink composition may be used as the material of the curable ink. Examples of the radiation curable ink composition include a mixture containing an acrylic monomer and a photopolymerization initiator.

Figure 1B:
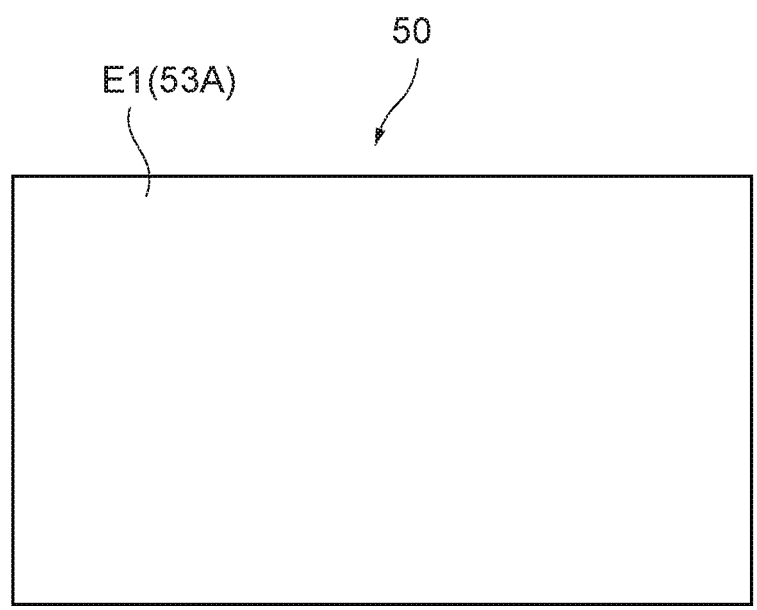

As illustrated in FIG. 1A, the printed material 50 has a first region E1 and a second region E2. The first region E1 is a region where a matte layer 53A is formed as the decorative printed layer 53. The second region E2 is a region where a gloss layer 53B is formed as the decorative printed layer 53. Note that, as illustrated in FIG. 1B, the printed material 50 may be constituted only by the first region E1 where the matte layer 53A is formed.

Figure 2A:
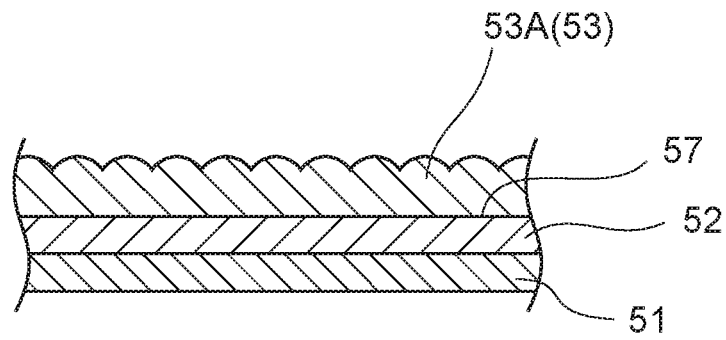
FIGS. 2A to 2C are partial cross-sectional views of the printed material.
Figure 2B:
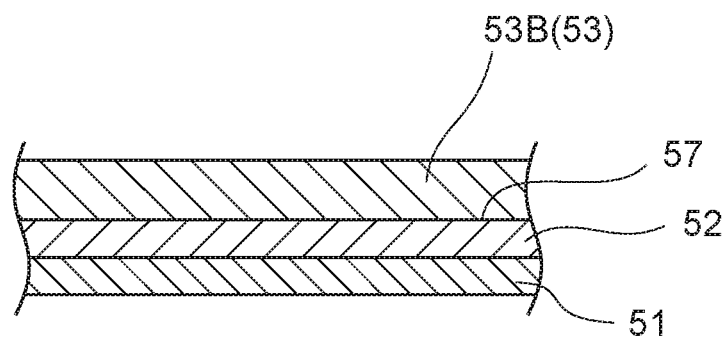
Figure 2C:
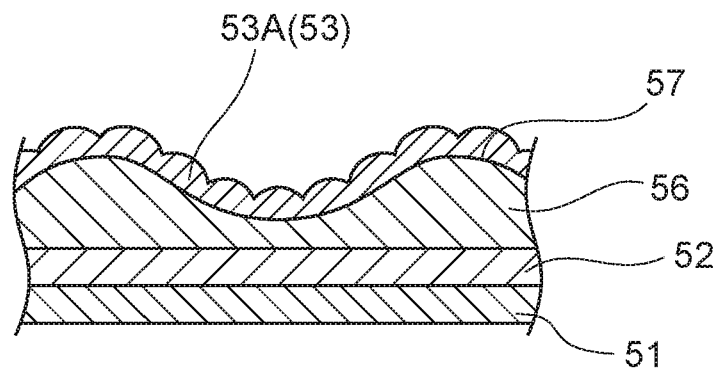

FIG. 2A is a cross-sectional view of the first region E1 where the matte layer 53A is formed. As illustrated in FIG. 2A, the matte layer 53A is a layer in which a shape of the surface is changed so as to have three-dimensional irregularities to reduce a gloss level indicative of glossiness. FIG. 2B is a cross-sectional view of the second region E2 where the gloss layer 53B is formed. As illustrated in FIG. 2B, the gloss layer 53B is a layer whose surface is formed so as to have a smooth planar shape to increase the gloss level indicative of the glossiness. Specifically, to describe a difference in the gloss levels between the matte layer 53A and the gloss layer 53B, both can be distinguished that measured values by a 60-degree glossmeter are relatively different by 10 or more, preferably 20 or more, and more preferably 30 or more. Note that as illustrated in FIG. 2C, a foundation layer 56 that changes in shape in a three-dimensional manner may be formed in advance, and the matte layer 53A may be formed on a surface of the foundation layer 56. Note that in FIGS. 2A and 2B, the surface of the color printed layer 52, the surface of the foundation layer 56 in FIG. 2C, and the surface of the base material 51 in the case of direct printing on the base material 51 correspond to a printing surface 57 of the decorative printed layer 53.

Figure 3:
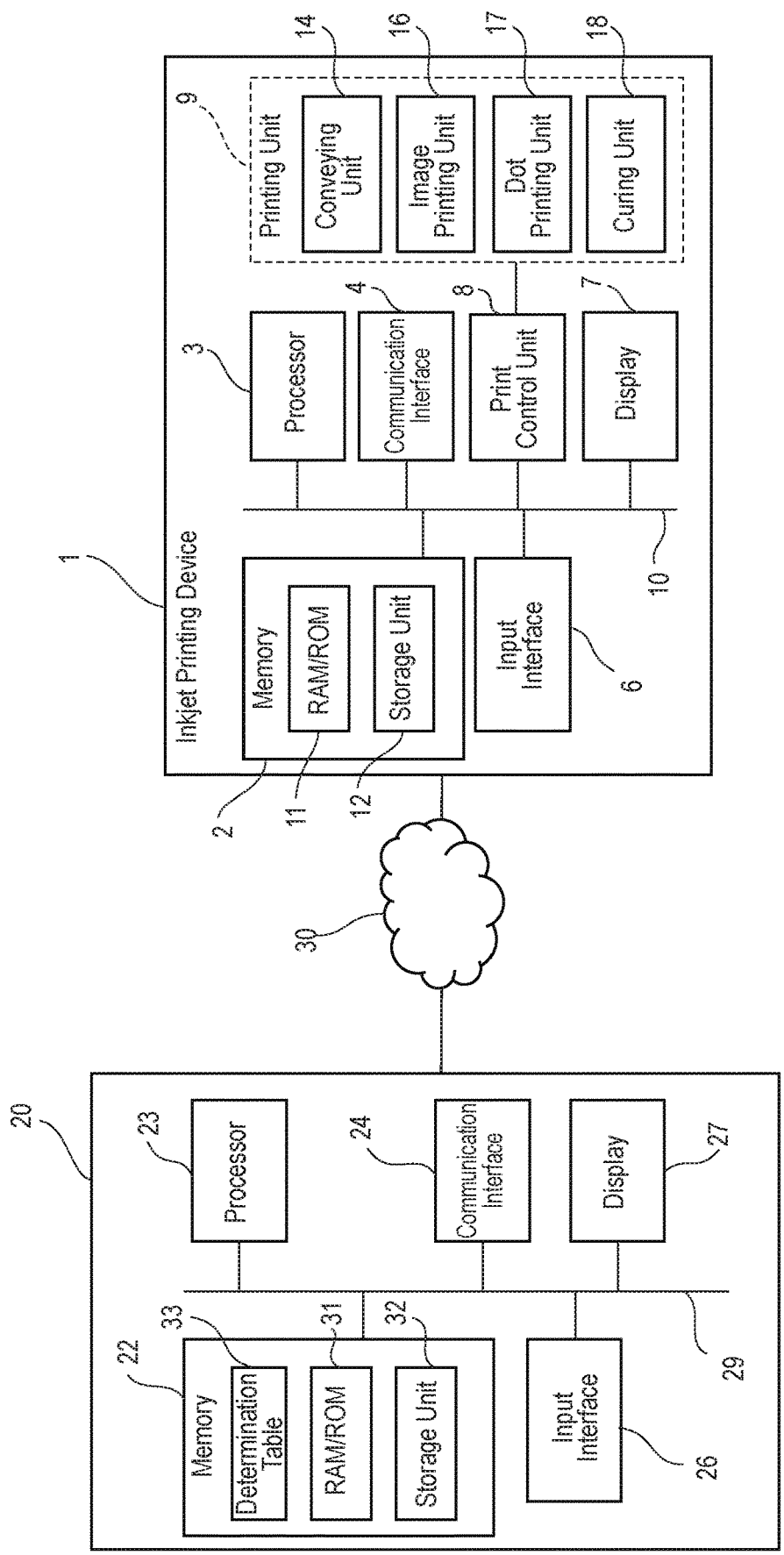
FIG. 3 is a block configuration diagram of an inkjet printing device according to an embodiment.

First, a configuration of the inkjet printing device 1 will be described with reference to FIG. 3. The inkjet printing device 1 is a device for forming the decorative printed layer 53 having the three-dimensional texture on the printing surface. The inkjet printing device 1 is connected to a terminal device 20 over a network 19, and is operated by the terminal device 20. However, the operation may be directly performed by the inkjet printing device 1 without via the terminal device 20.

The inkjet printing device 1 includes a memory 2, a processor 3, a communication interface 4, an input interface 6, a display 7, a print control unit 8, and a printing unit 9. The memory 2, the processor 3, the communication interface 4, the input interface 6, the display 7, and the print control unit 8 are mutually connected by connection means 10 using a communication path or a signal line. The print control unit 8 is connected to the printing unit 9.

The memory 2 holds various kinds of information for operating the inkjet printing device 1. The memory 2 includes a series of pieces of instruction information executable by the processor 3 and constitutes a medium usable by a computer connected to the processor 3. The memory 2 includes a RAM/ROM 11 and a storage unit 12. The processor 3 executes, for example, an operating system and an application program in the inkjet printing device 1. The communication interface 4 is a device that communicates with an external device to exchange information. The input interface 6 is a device for inputting information from outside. The display 7 is a device for displaying the information.

Each functional element of the inkjet printing device 1 is achieved by loading predetermined software on the processor 3 or the memory 2 and executing the software. The processor 3 causes the communication interface 4, the input interface 6, the display 7, and the print control unit 8 to operate in accordance with the software to read and write data in the memory 2. Data or a database necessary for the process are stored in the memory.

The print control unit 8 controls printing by the printing unit 9. The print control unit 8 transmits control signals to respective components of the printing unit 9 for control. The printing unit 9 includes a conveying unit 14, an image printing unit 16, a dot printing unit 17 (printing unit), and a curing unit 18. The conveying unit 14 is a mechanism that conveys the base material 51, which is the target for printing, to the image printing unit 16, the dot printing unit 17, and the curing unit 18. The image printing unit 16 generates the color printed layer 52 produced by ejecting color ink and reproducing an image based on acquired image data. The dot printing unit 17 ejects the curable ink based on dot pattern data to generate the decorative printed layer 53. The curing unit 18 is a mechanism for curing the curable ink. For example, when the curable ink is cured by ultraviolet light, the curing unit 18 includes an ultraviolet irradiation unit.

The terminal device 20 includes a memory 22, a processor 23, a communication interface 24, an input interface 26, and a display 27. The memory 22, the processor 23, the communication interface 24, the input interface 26, and the display 27 are mutually connected by connection means 29 using a communication path or a signal line. The memory 22 includes a determination table 33, a RAM/ROM 31, and a storage unit 32. The determination table 33 is various determination conditions necessary to perform printing by the inkjet printing device 1. Note that the processor 23, the communication interface 24, the input interface 26, and the display 27 have functions of same purposes as those that have been described in the description of the inkjet printing device, and thus descriptions thereof will be omitted.

Next, with reference to FIG. 4 to FIG. 11, an inkjet printing method according to the present embodiment will be described. This method forms the decorative printed layer 53 having the three-dimensional texture on the printing surface 57. Note that respective steps in the following description are performed by causing the print control unit 8 to operate by the processor with a memory based on a series of pieces of instruction information that can be performed by the processor. In other words, the print control unit 8 controls each component of the printing unit 9 based on the instruction information.

Figure 4:
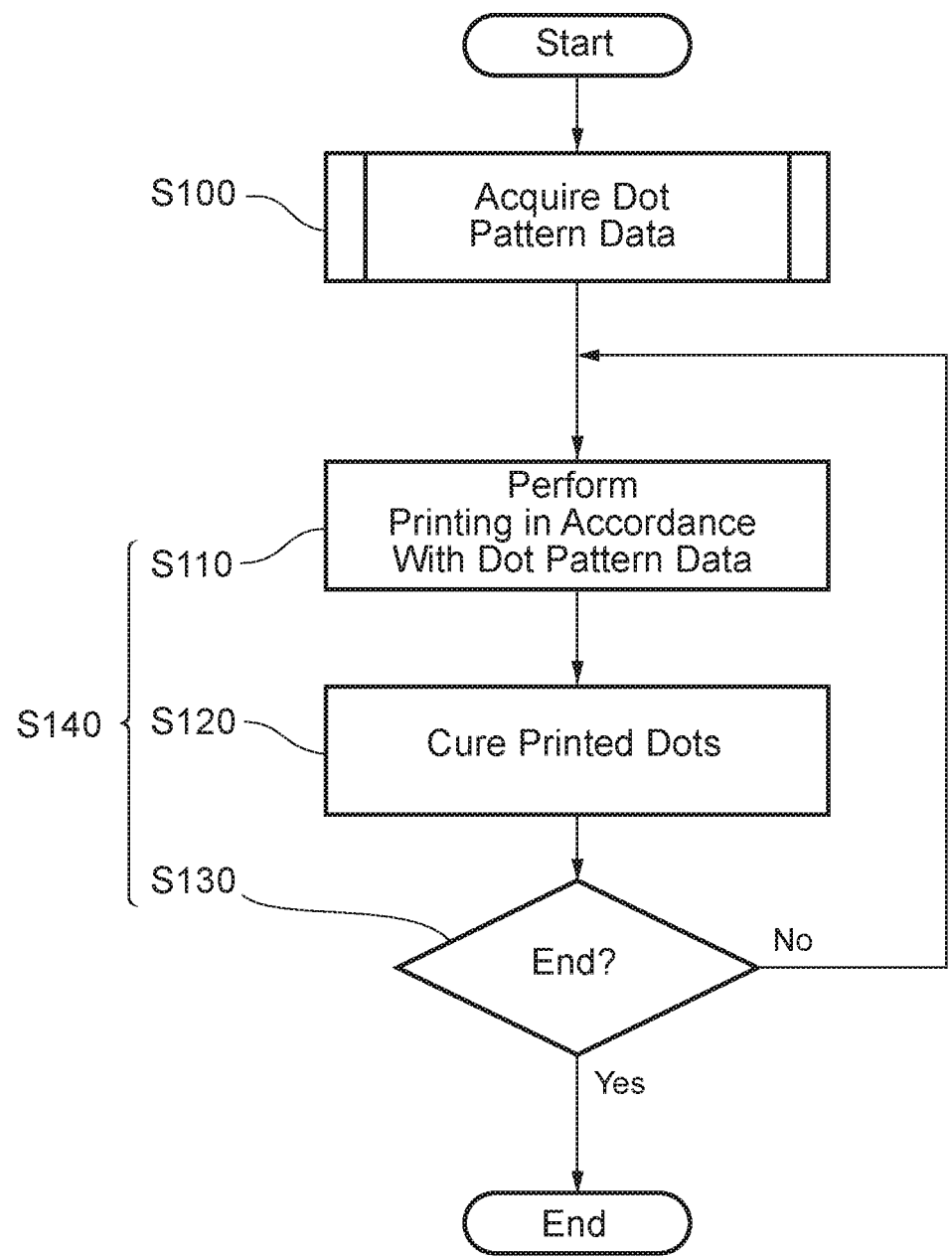
FIG. 4 is a flow chart depicting contents of an inkjet printing method.

As illustrated in FIG. 4, the inkjet printing method includes a dot pattern data acquiring step (Step S100), a printing step (Step S110), a curing step (Step S120), and a repetitive determining step (Step S130). Thus, the inkjet printing method includes a repetitive step (Step S140) that repeatedly determines the printing step S110, the curing step S120, and the repetitive determining step S130 (Step S140). Note that there may be a case where the first printing in the repetition is referred to as the "first pass," the second printing is referred to as the "second pass," and the M-th printing is referred to as the "M-th pass."

Figure 8A:
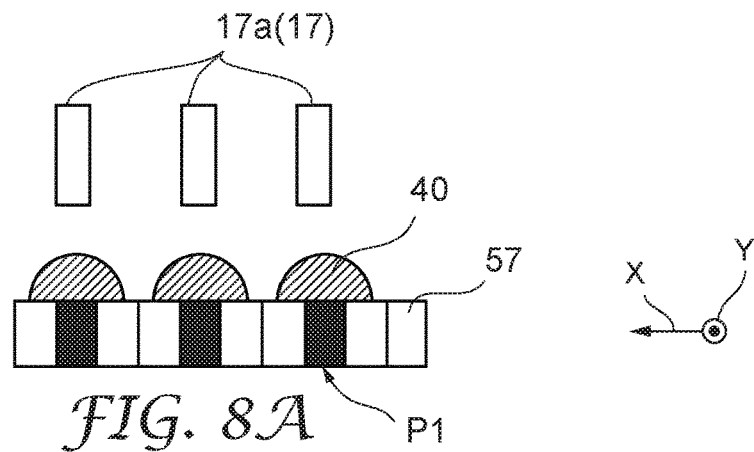
FIGS. 8A to 8D are schematic views illustrating a state when a matte layer is formed.
Figure 8B:
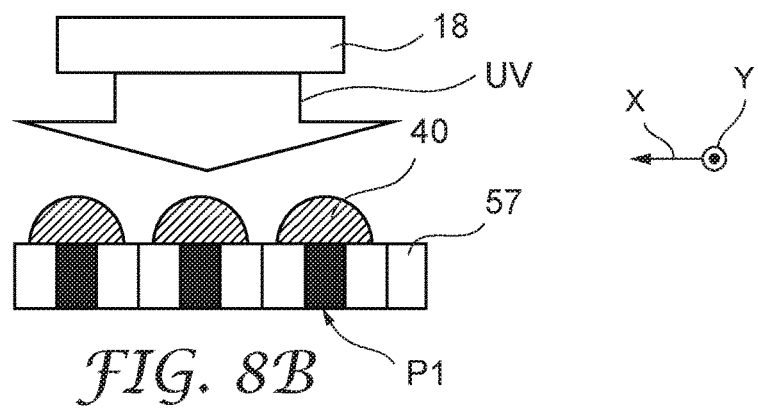
Figure 8C:
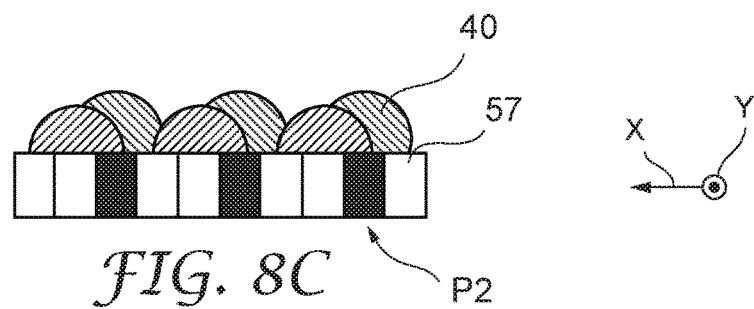
Figure 8D:
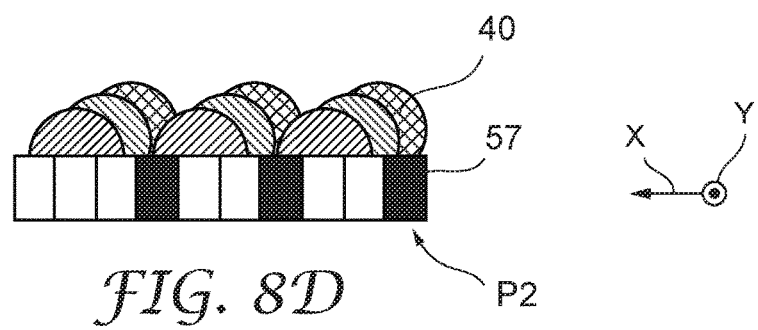

In the dot pattern data acquiring step 8100, the print control unit 8 acquires the dot pattern data. The dot pattern data is information indicating how the dot printing unit 17 in the inkjet printing device 1 prints dots of the curable ink on the printing surface 57. Note that the dot pattern data may be generated by the terminal device 20 or may be generated by the inkjet printing device 1. The dot pattern data indicates printing positions of dots 40 to be printed on the printing surface 57. The dot data also holds positional information of the dots 40 in each pass. FIGS. 8A to 8D are schematic views illustrating a state when the matte layer is formed. An X direction in FIGS. 8A to 8D indicates a direction orthogonal to a conveying direction Y of the conveying unit 14 conveying the base material 51. For example, in FIGS. 8A to 8D, the dot pattern data holds positional information of a position P1 of the dot 40 printed in the first pass (FIG. 8A), positional information of a position P2 of the dot 40 printed in the second pass (FIG. 8C), and positional information of a position P3 of the dot 40 printed in the third pass (FIG. 8D). Note that in FIG. 8A to FIG. 9B, the printed positions of the dots 40 on the printing surface 57 are filled with black.

Here, the dot pattern data indicates that a distance between the adjacent dots 40 in the first region E1 where the matte layer 53A is formed becomes a distance where the adjacent dots 40 before the curing are allowed to be maintained independently without bonding to one another. Meanwhile, the dot pattern data indicates that a distance between the adjacent dots 40 in the second region E2 where the gloss layer 53B is formed becomes a distance where the adjacent dots 40 before the curing bond to one another.

For example, as illustrated in the left drawings of FIGS. 9A and 9B, when the distance between the printed dots 40 is too close, the dots 40 before the curing having flowability are in contact with one another to bond together. The bonding is effective to form a smooth surface like the gloss layer 53B, but is disadvantageous to form a surface with irregularities like the matte layer 53A. On the other hand, as illustrated in FIGS. 8A and 8B, when the predetermined distance is maintained between the printed dots 40, the adjacent dots 40 before the curing are allowed to be maintained independently without bonding to one another. Such an independent state is disadvantageous to form the smooth surface like the gloss layer 53B, but is advantageous to form the surface with irregularities like the matte layer 53A. Therefore, the dot pattern data employs the positional relationship illustrated in FIGS. 8A and 8B to form the matte layer 53A, and employs the positional relationship illustrated in FIGS. 9A and 9B to form the gloss layer 53B. For example, to form the matte layer 53A, a center-to-center distance of the adjacent dots 40 can be configured to be 105 µm or greater with an ink diameter of 100 µm.

However, to form the matte layer 53A, the positional relationship of FIGS. 9A and 9B may be employed similarly to the gloss layer 53B up to a thickness to some extent, and the positional relationship of FIGS. 8A and 8B may be employed only to the vicinity of the surface of the matte layer 53A. That is, at least the dot pattern data corresponding to the step of printing of the last dots 40 may indicate that the distance between the adjacent dots 40 in the first region E1 where the matte layer 53A is formed becomes a distance where the adjacent dots 40 before the curing are allowed to be maintained independently without bonding to one another.

Figure 10:
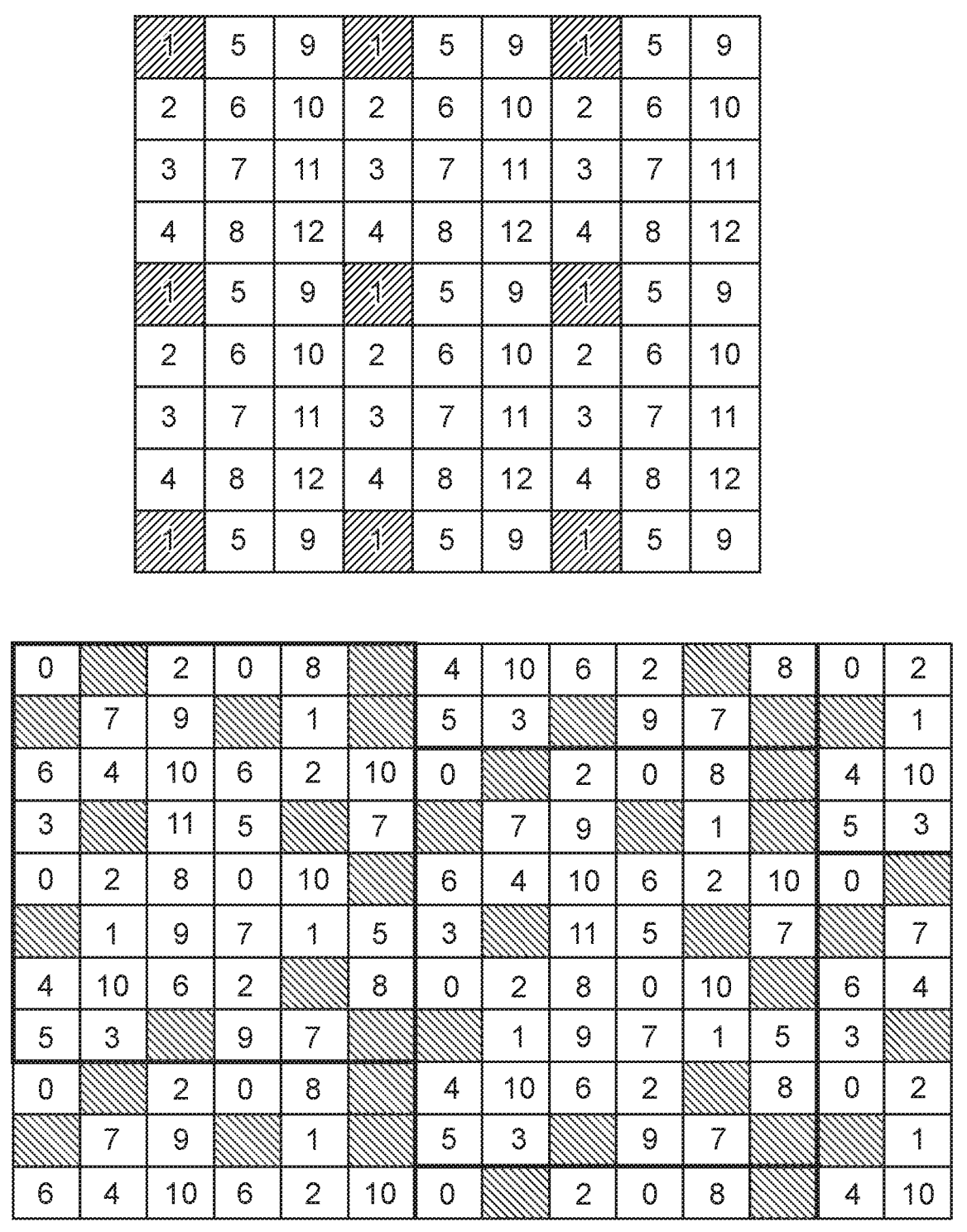

Here, as illustrated in FIG. 10, the first region E1 includes a plurality of pattern regions separated into a predetermined number of sections (see also FIGS. 2A to 2C). The dot pattern data indicates an order of the printing of the dots 40 on the respective sections in the pattern region. FIG. 10 describes orders of the paths in which the dots 40 are printed in the sections. For example, the dots 40 are printed on the sections denoted as "1" in the first pass, and the dots 40 are printed on the sections denoted as "2" in the second pass. Here, the dot 40 formed on the certain pattern region in the N-th path is separated from the dot 40 formed on the adjacent pattern region in the N-th path by a distance where the adjacent dots 40 are allowed to be maintained independently without bonding to one another. In FIG. 10, the pattern region is separated into the "3×4" sections. The printing orders of the dots 40 are set aligned by a fixed rule from the first to the twelfth paths. In FIG. 10, the sections where the dots 40 are formed in the certain pattern region in the first pass are colored, and sufficient distances are ensured to one another in the sections.

Note that in the printing step 110 for printing the respective dots 40, the dots 40 may be printed on the randomly selected sections in the pattern region. Furthermore, the number of the sections where the dots 40 are printed in the repetitive step S140 may be less than the number of sections BB in the pattern region. For example, in an example illustrated in FIG. 10B 10, the printing orders of the dots 40 are randomly set in the pattern region. In addition, although the pattern region is separated into the total 48 sections of "6×8," the sections BB where the dots 40 are not printed are present in the pattern region. Also, the dots 40 are formed in the plurality of sections in the pattern region in one-time pass. For example, the dots 40 are printed on the four sections in the tenth pass. Note that in this case as well, the dot 40 formed on the certain pattern region in the N-th path is separated from the dot 40 in the same pattern region and the dot 40 formed on the adjacent pattern region in the N-th path by a distance where the dots 40 are allowed to be maintained independently without bonding to one another.

Note that the dot pattern data may be in a raster image format. The raster image is a data format in which one pixel-points are arranged in a grid pattern vertically and horizontally. The dot pattern data may also include information indicative of sizes of the dots 40 to be printed.

Note that the dot pattern data when the gloss layer 53B is formed may also include the information of the same gist as that in the case where the above-described matte layer 53A is formed. However, when the printing positions of the dots 40 are set, the distance is set such that the adjacent dots 40 before the curing do not bond to one another.

Figure 5:
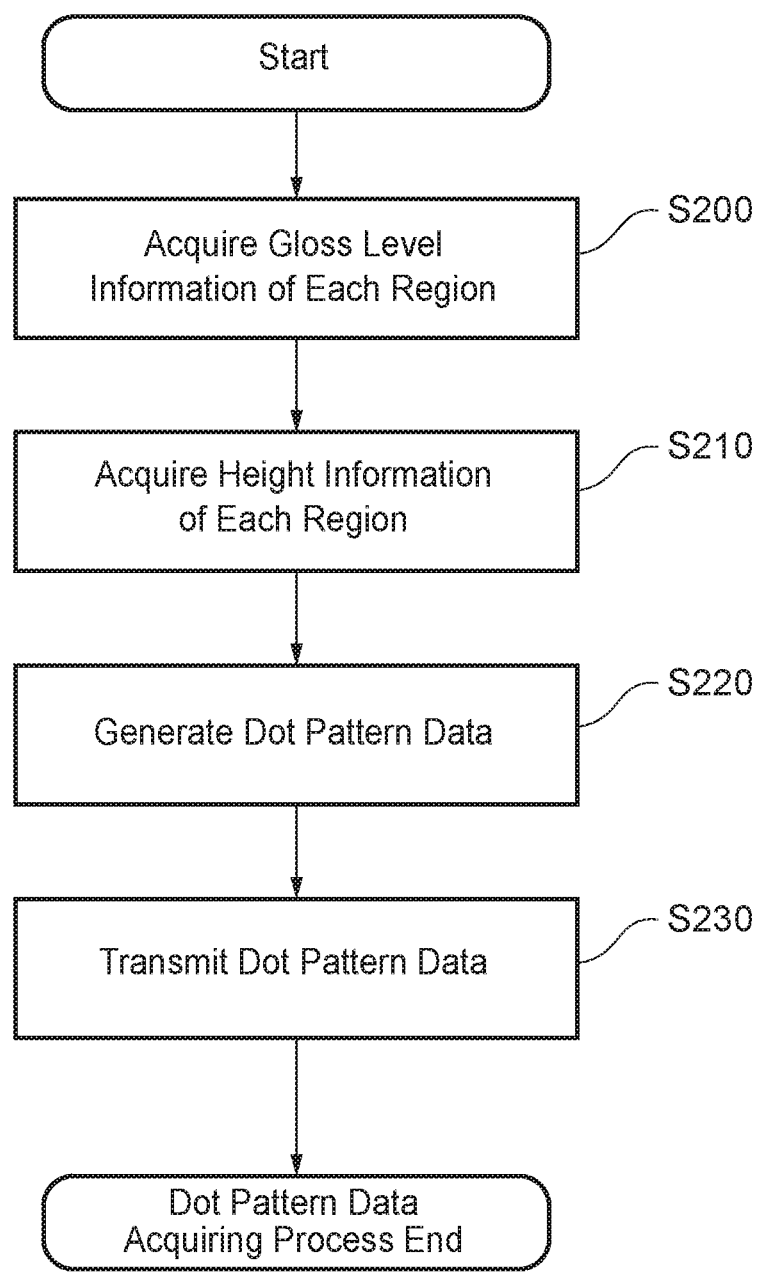
FIG. 5 is a flow chart depicting contents of a dot pattern data acquiring process.

Detailed contents of the dot pattern data acquiring process for acquiring the dot pattern data as described above will be described with reference to FIG. 5. Note that, here, it is assumed that the terminal device 20 performs the dot pattern data acquiring process. As depicted in FIG. 5, the dot pattern data acquiring process includes a gloss level information acquiring step (Step S200), a height information acquiring step (Step S210), a dot pattern data generating step (Step S220), and a dot pattern data transmitting step (Step S230).

In the gloss level acquiring step S200, the processor 23 acquires gloss level information of each region. Note that although the "region" here may be the pattern region described above, a region set by another method may be employed. Next, in the height information acquiring step S210, the processor 23 acquires height information of each region. The gloss level information and the height information are information indicative of that the decorative printed layer 53 at which gloss level and which height is planned to be formed at which position on the printing surface 57. Note that the gloss level information and the height information may be acquired from the input interface to which desired values have been input by a user or may be income by reading the data in the memory 22.

In the dot pattern data generating step S220, the processor 23 generates the dot pattern data based on any information including the acquired gloss level information and height information. When the gloss level information indicates that the gloss level information is lower than a specific glossiness, the dot pattern data generated at this time indicates that the distance between the adjacent dots 40 becomes a distance where the adjacent dots 40 before the curing are allowed to be maintained independently without bonding to one another. That is, the region where the gloss level information is lower than the specific glossiness is set as the first region E1 where the matte layer 53A is formed. When the gloss level information indicates that the gloss level information is higher than the specific glossiness, the dot pattern data indicates that the adjacent dots 40 before the curing are disposed at a distance where the adjacent dots 40 bond to one another. That is, the region where the gloss level information is higher than the specific glossiness is set as the second region E2 where the gloss layer 53B is formed. In the dot pattern data transmitting step S230, the communication interface 24 transmits the dot pattern data to the print control unit 8 via a network 30 and the communication interface 4. Now the processes depicted in FIG. 5 end.

Returning to FIG. 4, in the printing step S110, the print control unit 8 controls the dot printing unit 17 and prints the dots 40 based on the dot pattern data. In the curing step (Step S120), the print control unit 8 controls the curing unit 18 to cure the printed dots 40. Specifically, as illustrated in FIG. 8A, nozzles 17a of the dot printing units 17 eject the dots 40 to the positions P1 defined by the dot pattern data. Then, the curing unit 18 irradiates the dots 40 with ultraviolet light to cure the dots 40. Note that the UV irradiation by the curing unit 18 may be performed substantially simultaneously with the printing of the dots 40, or may be performed at intervals over time after printing the dots 40. In the repetitive determining step S130, the print control unit 8 determines whether all of the dots 40 set by the dot pattern data have been printed. For example, in the example illustrated in FIG. 10, the print control unit 8 determines that the repetition has ended when the print control unit 8 grasps that the printing of the dots 40 in the twelfth pass ends. In a case where it is determined that the printing does not end in the repetitive determining step S130, the process is repeated from the dot printing step S110. In a case where it is determined that the printing ends, the processes depicted in FIG. 4 end.

Figure 6:
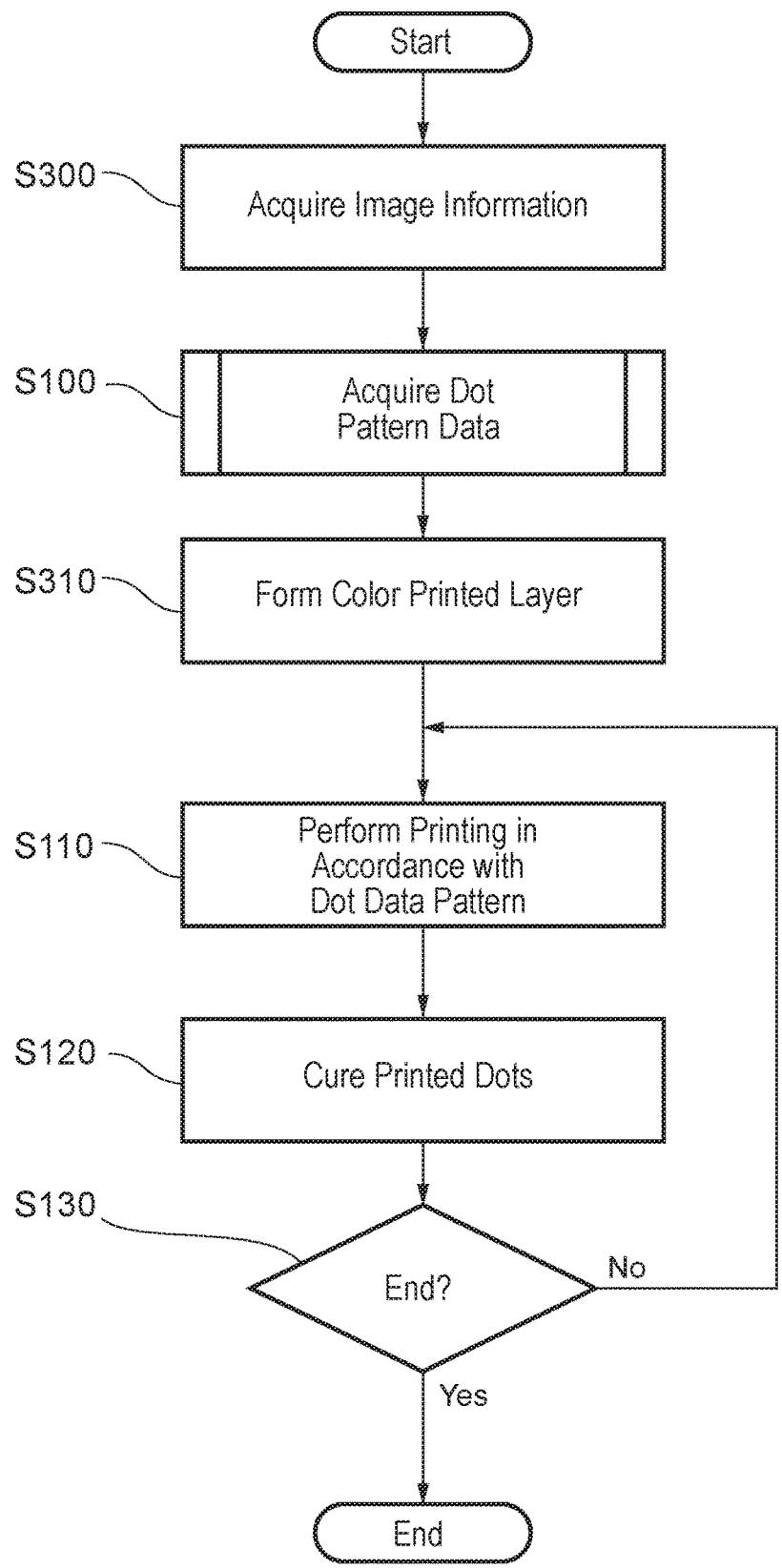
FIG. 6 is a flow chart depicting the contents of the inkjet printing method.

As the inkjet printing method, the processes depicted in FIG. 6 may be performed. The method includes an image information acquiring step (Step S300), the dot pattern data acquiring step (Step S100), a color printed layer forming step (Step S310), the printing step (Step S110), the curing step (Step S120), and the repetitive determining step (Step S130).

In the image information acquiring step S300, the processor 23 in the terminal device 20 acquires image information indicating printed contents to be printed on the printing surface 57. In the dot pattern data acquiring step S100, the print control unit 8 acquires the dot pattern data generated based on the image information. In the color printed layer forming step S310, the print control unit 8 causes the image printing unit 16 to perform the printing based on the image information acquired in S300 to form the color printed layer 52. Note that the processes of S110 to S130 are the same as those in FIG. 5, and thus descriptions thereof will be omitted.

Figure 11:
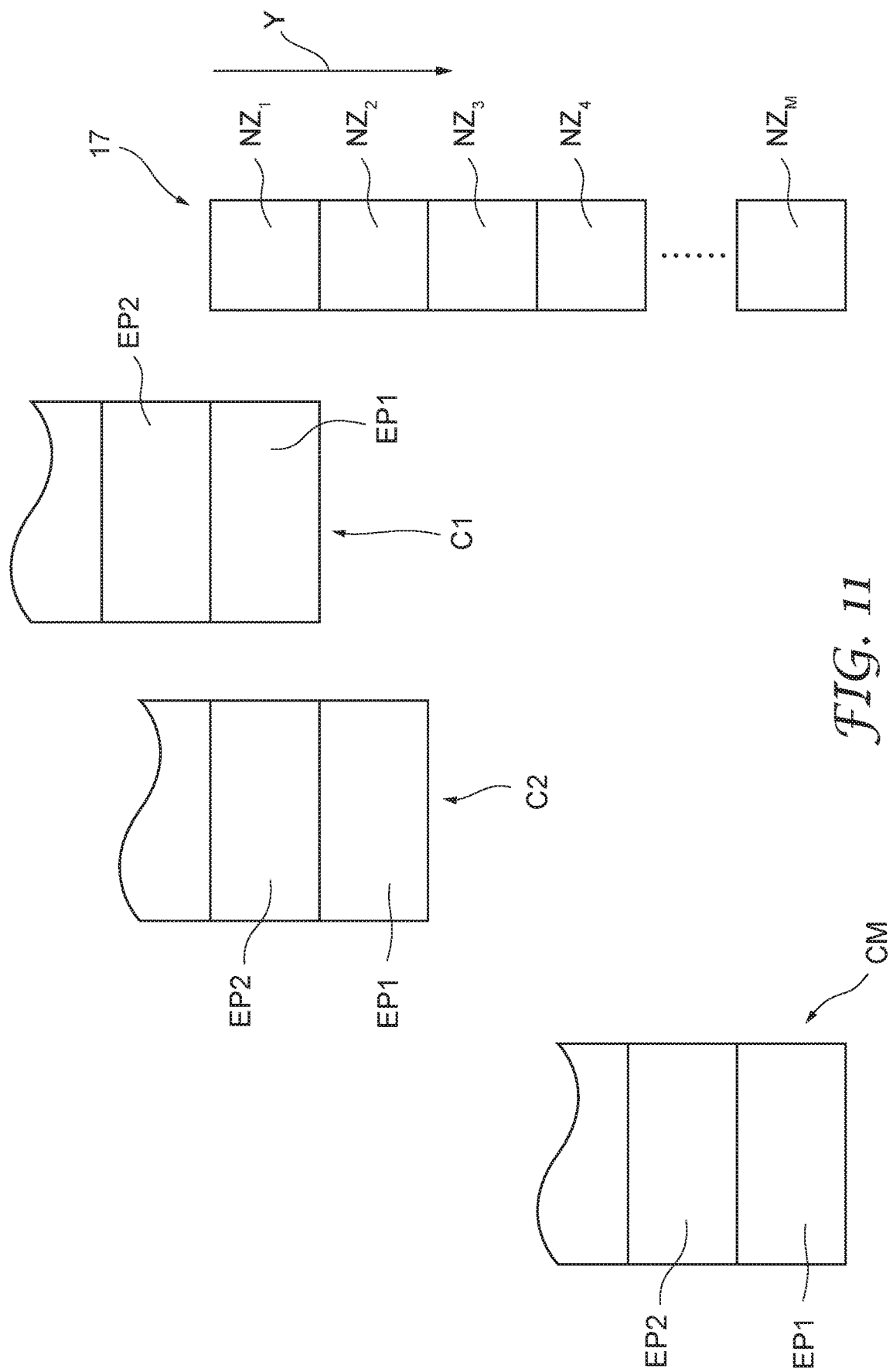
FIG. 11 is a conceptual drawing for explaining contents of multi-pass printing.

As the inkjet printing method, the step of repeating the dot printing step and the curing step may be performed by a multi-pass system. The process in this case will be described with reference to FIG. 7 and FIG. 11. As illustrated in FIG. 11, the large number of nozzle groups of the dot printing unit 17 are divided into nozzle groups $NZ_1$ and $NZ_2$ to $NZ_M$. The nozzle groups $NZ_1$ and $NZ_2$ to $NZ_M$ are arranged from an upstream in the conveying direction Y of the conveying unit 14 in order. The nozzle group $NZ_1$ performs the printing of the dots 40 in the first pass, the nozzle group $NZ_2$ performs the printing of the dots 40 in the second pass dots 40, and the nozzle group $NZ_M$ performs the printing of dots 40 in the M-th pass. The conveying unit 14 conveys the base material 51 on which color printing has been performed to the dot printing unit 17. The printed region EP1 or EP2 of the base material 51 indicates a range corresponding to one printed material 50, and a plurality of the printed regions EP1 and EP2 are disposed in a longitudinal direction of the base material 51. First, the nozzle group $NZ_1$ performs the printing of the dots 40 in the first pass on the printed region EP1 (see a conveyance position C1). Next, the nozzle group $NZ_2$ performs the printing of the dots 40 in the second pass on the printed region EP1, and at the same time, the nozzle group $NZ_1$ performs the printing of the dots 40 in the first pass on the printed region EP2 (see a conveyance position C2). The conveyance and the printing of the same purpose are repeated, and the nozzle group $NZ_M$ performs the printing of the dots 40 in the M-th pass on the printed region EP$_1$ (conveyance position CM). Thus, the dots 40 in the first to the M-th passes are printed on the printed regions EP.

Figure 7:
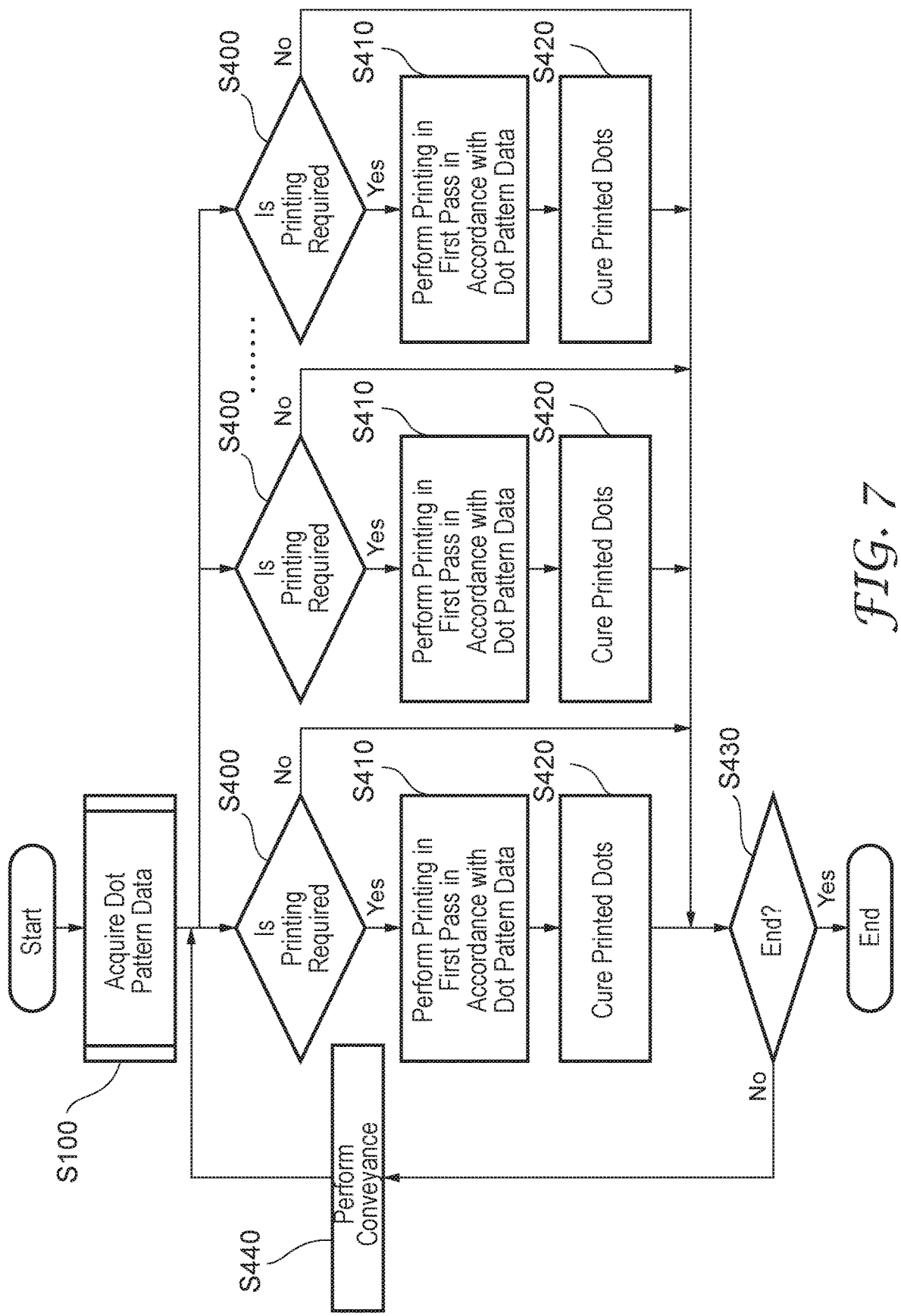
FIG. 7 is a flow chart depicting the contents of the inkjet printing method.

Specifically, as depicted in FIG. 7, the print control unit 8 acquires the dot pattern data (Step S100). Next, the print control unit 8 determines whether the printing is necessary in each of the nozzle groups $NZ_1$ and $NZ_2$ to $NZ_M$ (Step S400). In a case where the printing is determined to be necessary in each of the nozzle groups $NZ_1$ and $NZ_2$ to $NZ_M$, the print control unit 8 prints the dots 40 according to the corresponding pass (Step S410) and cures the dots 40 (Step S420). In a place where the printing is determined to be unnecessary in each of the nozzle groups $NZ_1$ and $NZ_2$ to $NZ_M$, the print control unit 8 does not perform the printing or the curing. Next, the print control unit 8 determines whether the repetition ends (Step S430). When the repetition does not end, the print control unit 8 controls the conveying unit 13 to convey the base material 51 such that the printed regions are shifted by one step (Step S440), and the processes are repeated from Step S400. For example, in the state indicated by the conveyance position C1 in FIG. 11, the print control unit 8 determines that the printing is necessary in the nozzle group $NZ_1$, and determines that the printing is unnecessary in the other nozzle groups. When the printing is determined to end in Step S430, the processes depicted in FIG. 7 end.

Next, actions and effects of the inkjet printing method and the inkjet printing device according to the present embodiment will be described.

An inkjet printing method according to the embodiment forms a decorative printed layer having a three-dimensional texture on a printing surface. The inkjet printing method includes: a step of printing dots of curable ink that cure under a predetermined condition based on dot pattern data indicative of printed positions of the dots to be printed on the printing surface; and a step of curing the printed dots. The dot pattern data indicates that: a distance between the adjacent dots becomes a distance where the adjacent dots before the curing are allowed to be maintained independently without bonding to one another in a first region; and the distance between the adjacent dots becomes a distance where the adjacent dots before the curing bond to one another in a second region different from the first region.

According to the above-described configuration, the distance between the adjacent dots becomes the distance where the adjacent dots before the curing are allowed to be maintained independently without bonding to one another in the first region. In this case, since the shape of irregularities is easily formed on the surface of the decorative printed layer, the matte layer can be excellently formed in the first region. On the other hand, in the second region, the distance between the adjacent dots becomes the distance where the adjacent dots before the curing bond to one another. In this case, since the surface of the decorative printed layer is likely to smooth, the gloss layer can be excellently formed in the second region.

The inkjet printing method may further include: the step of acquiring the gloss level information indicative of the glossiness in the region in the printing surface; and the step of acquiring the dot pattern data based on the gloss level information. In this case, the appropriate decorative printed layer can be formed in each region so as to correspond to the gloss level information.

The dot pattern data may indicate that: the distance between the adjacent dots becomes the distance where the adjacent dots before the curing are allowed to be maintained independently without bonding to one another when the gloss level information indicates that the gloss level information is lower than the specific glossiness; and the distance between the adjacent dots becomes the distance where the adjacent dots before the curing bond to one another when the gloss level information indicates that the gloss level information is higher than the specific glossiness. In this case, the matte layer can be excellently formed in the region where the gloss level information is lower than the specific glossiness, and the gloss layer can be excellently formed in the region where the gloss level information is higher than the specific glossiness. The inkjet printing method may further include the step of repeating the step of printing the dots and the step of curing the printed dots by a plurality of times. The decorative printing in which the cured dots of the curable ink are multi-layered on at least a part of the printing surface may be formed. In this case, the decorative printed layer having a sufficient thickness can be formed.

The dot pattern data may include the information on the positions of the dots on the printing surface in the step of printing the respective dots. In this case, the dots can be printed on the correct positions on the printing surface.

The step of repeating may be performed by a multi-pass system. This allows efficient printing.

The dot pattern data may be in a raster image format. This facilitates the handling of the dot pattern data.

The curable ink may be colorless and transparent. Accordingly, the colorless and transparent decorative printed layer can be formed.

The dot pattern data may further include the information indicating the sizes of the dots to be printed. In this case, printing the dots having various sizes allows printing the decorative printed layer that can provide a variety of expressions further.

The inkjet printing method may further include: the step of acquiring the information to designate the height of the decorative printed layer; and the step of acquiring the dot pattern data based on the information to designate the height. As a result, the dot pattern data that considers the height of the decorative printed layer in each region can be acquired.

The inkjet printing method may further include the step of repeating the step of printing the dots and the step of curing the printed dots by a plurality of times. At least the dot pattern data corresponding to the step of printing the last dots may indicate that the distance between the adjacent dots in the first region becomes the distance where the adjacent dots before the curing are allowed to be maintained independently without bonding to one another. In this case, since the shape of irregularities can be formed at least on the surface of the decorative printed layer, the matte layer can be excellently formed.

The inkjet printing method may further include the step of repeating the step of printing the dots and the step of curing the printed dots by a plurality of times. The first region may include the plurality of pattern regions separated into the predetermined number of sections. In the step of printing the respective dots, the dots may be printed on the sections randomly selected in the pattern regions. This allows the dots to be randomly printed, thus ensuring forming the decorative printed layer having a natural pattern texture.

The inkjet printing method may further include the step of repeating the step of printing the dots and the step of curing the printed dots by a plurality of times. The first region may include the plurality of pattern regions separated into the predetermined number of sections. The number of sections on which the dots are printed in the step of repeating may be smaller than the predetermined number of sections. In this case, since the number of times that the printing and the curing are repeated can be reduced, the decorative printed layer can be efficiently formed.

Figure 12B:
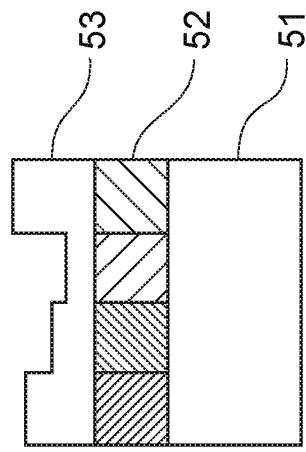
FIGS. 12A and 12B are conceptual drawings for explaining an action and an effect.
Figure 12A:
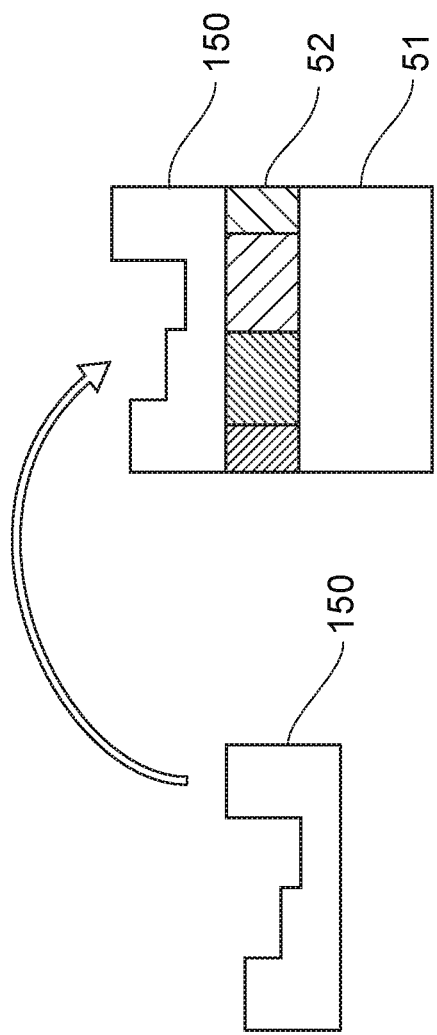

In addition, as illustrated in FIG. 12A, the conventional method that pastes a transparent sheet 150 with irregularities formed by embossing to the base material 51 generated a mismatch between patterns of the designed color printed layer 52 (the patterns of colors are differentiated by hatching) and positions of the irregularity patterns formed by the embossing. In contrast, as illustrated in FIG. 12B, the formation of the designs and the irregularities by the inkjet printing method matches patterns of the color printed layer 52 and positions of the irregularity patterns of the decorative printed layer 53 (so-called a state in which registration is provided), and therefore, a decorative film with further excellent appearance can be provided.

The inkjet printing method according to one configuration of the present invention forms the decorative printed layer having the three-dimensional texture on the printing surface. The inkjet printing method includes: the step of acquiring the dot pattern data indicative of the printed positions of the dots to be printed on the printing surface corresponding to the gloss level information indicative of the glossiness in the region in the printing surface; the step of printing the dots of the curable ink based on the dot pattern data; and the step of curing the printed dots. The dot pattern data indicates that: the distance between the adjacent dots becomes the distance where the adjacent dots before the curing are allowed to be maintained independently without bonding to one another when the gloss level information indicates that the gloss level information is lower than the specific glossiness; and the distance between the adjacent dots becomes the distance where the adjacent dots before the curing bond to one another when the gloss level information indicates that the gloss level information is higher than the specific glossiness.

According to the configuration described above, when the gloss level information is lower than the specific glossiness, the distance between adjacent dots becomes the distance where the adjacent dots before the curing can be maintained independently without bonding to one another. In this case, since the shape of irregularities is easily formed on the surface of the decorative printed layer, the matte layer having the low glossiness can be excellently formed. On the other hand, when the gloss level information is higher than the specific glossiness, the distance between adjacent dots becomes the distance where the adjacent dots before the curing are bonded to one another. In this case, since the surface of the decorative printed layer is likely to smooth, the gloss layer having the high glossiness can be excellently formed.

The inkjet printing device according to one configuration of the present invention forms the decorative printed layer having the three-dimensional texture on the printing surface. The inkjet printing device includes the printing unit, the curing unit, the processor, and the medium. The printing unit is configured to eject the curable ink that cures under the predetermined condition. The medium includes a series of the pieces of instruction information executable by the processor and usable by the computer connected to the processor. The instruction information: causes the printing unit to print the dots of the curable ink based on the dot pattern data indicative of the printed positions of the dots to be printed on the printing surface; and controls the curing unit so as to cure the printed dots. The dot pattern data indicates that: the distance between the adjacent dots becomes the distance where the adjacent dots before the curing are allowed to be maintained independently without bonding to one another in the first region; and the distance between the adjacent dots becomes the distance where the adjacent dots before the curing bond to one another in the second region different from the first region.

This inkjet printing device allows obtaining actions and curing similar to those of the above-described inkjet printing method.

The present invention is not intended to be limited to the embodiments described above.

For example, while the printing is repeated for a plurality of passes in the embodiments described above, the decorative printed layer may be formed by one-time printing and curing.

What is claimed is:

1. An inkjet printing method that forms a decorative printed layer having a three-dimensional texture on a printing surface, comprising:
   printing dots of curable ink that cure under a predetermined condition based on dot pattern data indicative of printed positions of the dots to be printed on the printing surface; and
   curing the printed dots, wherein
   the dot pattern data indicates that:
   a distance between the adjacent dots becomes a distance where the adjacent dots before the curing are allowed to be maintained independently without bonding to one another in a first region; and
   the distance between the adjacent dots becomes a distance where the adjacent dots before the curing bond to one another in a second region different from the first region
   and the inkjet printing method further comprises:
   repeating the printing of the dots and the curing of the printed dots by a plurality of times,
   wherein
   the decorative printing in which the cured dots of the curable ink are multi-layered on at least a part of the printing surface is formed and
   the repeating is performed by a multi-pass system, wherein
   the multi-pass system comprises:
      a dot printing unit,
      a conveying unit and
      a base material, wherein
         the dot printing unit comprising:
            a first nozzle group and a second nozzle group arranged from an upstream in the conveying direction of the conveying unit in order and
         the base material comprises:
            a first printed region and a second printed region disposed in a longitudinal direction of the base material, wherein
   the first nozzle group performs the printing of the dots in the first pass on the second printed region, when the second nozzle group performs the printing of the dots in the second pass on the first printed region.

2. The inkjet printing method according to claim 1, further comprising:
   acquiring gloss level information indicative of glossiness in a region in the printing surface; and
   acquiring the dot pattern data based on the gloss level information.

3. The inkjet printing method according to claim 2, wherein the dot pattern data indicates that:
   the distance between the adjacent dots becomes the distance where the adjacent dots before the curing are allowed to be maintained independently without bonding to one another when the gloss level information indicates that the gloss level information is lower than a specific glossiness; and
   the distance between the adjacent dots becomes the distance where the adjacent dots before the curing bond to one another when the gloss level information indicates that the gloss level information is higher than the specific glossiness.

4. The inkjet printing method according to claim 1 wherein
the dot pattern data is in a raster image format.

5. The inkjet printing method according to claim 1, wherein
the curable ink is colorless and transparent.

6. The inkjet printing method according to claim 1, wherein
the dot pattern data further includes information indicating sizes of the dots to be printed.

7. The inkjet printing method according to claim 1, further comprising:
acquiring information to designate a height of the decorative printed layer; and
acquiring the dot pattern data based on the information to designate the height.

8. The inkjet printing method according to claim 1, wherein
at least the dot pattern data corresponding to the printing of the last dots indicates that the distance between the adjacent dots in the first region becomes the distance where the adjacent dots before the curing are allowed to be maintained independently without bonding to one another.

9. The inkjet printing method according to claim 1, wherein
the dot pattern data includes information on positions of the dots on the printing surface in the printing of the respective dots.

10. An inkjet printing method that forms a decorative printed layer having a three-dimensional texture on a printing surface, comprising:
acquiring dot pattern data indicative of printed positions of dots to be printed on the printing surface corresponding to gloss level information indicative of glossiness in a region in the printing surface;
printing the dots of curable ink based on the dot pattern data; and
curing the printed dots, wherein
the dot pattern data indicates that:
a distance between the adjacent dots becomes a distance where the adjacent dots before the curing are allowed to be maintained independently without bonding to one another when the gloss level information indicates that the gloss level information is lower than a specific glossiness; and
the distance between the adjacent dots becomes a distance where the adjacent dots before the curing bond to one another when the gloss level information indicates that the gloss level information is higher than the specific glossiness, and
the inkjet printing method further comprises:
repeating the printing of the dots and the curing of the printed dots by a plurality of times,
wherein
the decorative printing in which the cured dots of the curable ink are multi-layered on at least a part of the printing surface is formed and
the repeating is performed by a multi-pass system, wherein
the multi-pass system comprising:
a dot printing unit,
a conveying unit and
a base material, wherein
the dot printing unit comprising:
a first nozzle group and a second nozzle group arranged from an upstream in the conveying direction of the conveying unit in order and the base material comprising:
a first printed region and a second printed region disposed in a longitudinal direction of the base material, wherein
the first nozzle group performs the printing of the dots in the first pass on the second printed region, when the second nozzle group performs the printing of the dots in the second pass on the first printed region.

11. An inkjet printing device that forms a decorative printed layer having a three-dimensional texture on a printing surface, comprising:
a printing unit configured to eject curable ink that cures under a predetermined condition;
a curing unit;
a processor; and
a medium that includes a series of pieces of instruction information executable by the processor and usable by a computer connected to the processor, wherein
the instruction information:
causes the printing unit to print dots of the curable ink based on dot pattern data indicative of printed positions of the dots to be printed on the printing surface; and
controls the curing unit so as to cure the printed dots, and
the dot pattern data indicates that:
a distance between the adjacent dots becomes a distance where the adjacent dots before the curing are allowed to be maintained independently without bonding to one another in a first region; and
the distance between the adjacent dots becomes a distance where the adjacent dots before the curing bond to one another in a second region different from the first region, wherein
the instruction information:
causes the repeating the printing of the dots and the curing of the printed dots by a plurality of times, wherein
the decorative printing in which the cured dots of the curable ink are multi-layered on at least a part of the printing surface is formed and
the inkjet printing device further comprises:
a dot printing unit,
a conveying unit and
a base material, wherein
the dot printing unit comprises:
a first nozzle group and a second nozzle group arranged from an upstream in the conveying direction of the conveying unit in order, and
the base material comprises:
a first printed region and a second printed region disposed in a longitudinal direction of the base material, wherein
the instruction information:
causes the first nozzle group performs the printing of the dots in the first pass on the second printed region, when the second nozzle group performs the printing of the dots in the second pass on the first printed region.

* * * * *